United States Patent
Tsuchiya

(10) Patent No.: US 11,433,763 B2
(45) Date of Patent: Sep. 6, 2022

(54) EVAPORATED FUEL TREATMENT APPARATUS

(71) Applicant: Toyota Jidosha Kabushiki Kaisha, Toyota (JP)

(72) Inventor: Akira Tsuchiya, Seto (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 17/002,276

(22) Filed: Aug. 25, 2020

(65) Prior Publication Data

US 2021/0061089 A1    Mar. 4, 2021

(30) Foreign Application Priority Data

Aug. 29, 2019  (JP) .............................. JP2019-156543

(51) Int. Cl.
*F02M 25/08* (2006.01)
*B60K 15/035* (2006.01)
*B01D 53/04* (2006.01)
*F16K 24/04* (2006.01)

(52) U.S. Cl.
CPC .... *B60K 15/03504* (2013.01); *B01D 53/0438* (2013.01); *B01D 53/0446* (2013.01); *F02M 25/0854* (2013.01); *F02M 25/0872* (2013.01); *F16K 24/04* (2013.01); *B01D 2253/102* (2013.01); *B01D 2257/702* (2013.01); *B01D 2259/4516* (2013.01); *B60K 2015/03514* (2013.01)

(58) Field of Classification Search
CPC ............... F02M 25/08; F02M 25/0854; F02M 25/0872; B01D 53/04; B01D 53/0438; B01D 2253/102; B01D 2259/4516; F16K 24/04; B60K 15/03504
See application file for complete search history.

(56) References Cited

U.S. PATENT DOCUMENTS 5,592,922 A * 1/1997 Denz ................. B60K 15/03504
                                                          123/520
5,632,252 A * 5/1997 Hyodo ................ F02D 41/0042
                                                          123/520

(Continued)

FOREIGN PATENT DOCUMENTS

CN        101344053 A      1/2009
CN        202325911 U      7/2012

(Continued)

*Primary Examiner* — John M Zaleskas

(74) *Attorney, Agent, or Firm* — Dinsmore & Shohl LLP

(57) ABSTRACT

An evaporated fuel treatment apparatus includes a main canister containing an adsorbent that is capable of adsorbing and desorbing evaporated fuel generated in a fuel tank; a sub-canister connected to the main canister, the sub-canister containing an additional adsorbent that is capable of adsorbing and desorbing evaporated fuel contained in an exhaust discharged from the main canister; and a connection pipe that connects the main canister and the sub-canister. The connection pipe includes a first portion that is located near a muffler, and a second portion which is a portion other than the first portion, the second portion being located apart from an exhaust pipe and located below the first portion in the vertical direction with respect to the vehicle.

2 Claims, 7 Drawing Sheets

(56) References Cited

U.S. PATENT DOCUMENTS

| | | | | |
|---|---|---|---|---|
| 5,687,697 | A * | 11/1997 | Ishikawa | B60K 15/03504 123/520 |
| 5,702,125 | A * | 12/1997 | Nakajima | B60K 15/03504 280/834 |
| 6,896,852 | B1 * | 5/2005 | Meiller | B01D 53/0415 123/519 |
| 2004/0173190 | A1 * | 9/2004 | Makino | F02M 25/0836 123/520 |
| 2006/0065253 | A1 * | 3/2006 | Reddy | F02M 25/089 123/520 |
| 2008/0149075 | A1 | 6/2008 | Toyoda et al. | |
| 2008/0283127 | A1 * | 11/2008 | Wang | B60K 15/03519 137/313 |
| 2009/0159055 | A1 * | 6/2009 | Oh | F02M 25/089 123/519 |
| 2011/0017069 | A1 * | 1/2011 | Murayama | B60K 15/03504 96/121 |
| 2011/0252972 | A1 * | 10/2011 | Ogawa | F02M 25/089 96/108 |
| 2011/0297127 | A1 * | 12/2011 | Aso | F02M 25/089 123/519 |
| 2013/0186375 | A1 * | 7/2013 | Hasegawa | F02M 25/06 123/519 |
| 2013/0263740 | A1 * | 10/2013 | Mani | F02M 25/0854 96/112 |
| 2013/0263741 | A1 * | 10/2013 | Mani | F02M 25/0854 96/112 |
| 2014/0202783 | A1 * | 7/2014 | Shomura | F02M 25/089 123/519 |
| 2014/0209188 | A1 | 7/2014 | Akiyama et al. | |
| 2016/0273495 | A1 * | 9/2016 | Yamamoto | F02M 25/089 |
| 2018/0274490 | A1 * | 9/2018 | Honjo | F02M 25/0872 |
| 2018/0298852 | A1 * | 10/2018 | Honjo | B01D 53/047 |
| 2019/0293030 | A1 * | 9/2019 | Honjo | B60K 15/03504 |

FOREIGN PATENT DOCUMENTS

| | | | |
|---|---|---|---|
| JP | 08246966 | A * | 9/1996 |
| JP | 2008238930 | A * | 10/2008 |
| JP | 2010270652 | A * | 12/2010 |
| JP | 2011-116209 | A | 6/2011 |
| JP | 2011117337 | A * | 6/2011 |
| JP | 2014-145337 | A | 8/2014 |
| JP | 2016-172501 | A | 9/2016 |

* cited by examiner

EVAPORATED FUEL TREATMENT APPARATUS

CROSS REFERENCE TO RELATED APPLICATION

This application claims priority to Japanese Patent Application No. 2019-156543 filed on Aug. 29, 2019, which is incorporated herein by reference in its entirety including the specification, claims, drawings, and abstract.

TECHNICAL FIELD

The present disclosure relates to a structure of an evaporated fuel treatment apparatus which is used in a vehicle that incorporates an engine, and which is configured to treat evaporated fuel generated in a fuel tank.

BACKGROUND

Many evaporated fuel treatment apparatuses are used for reducing emission of evaporated fuel into the atmosphere, and in such devices evaporated fuel generated in a fuel tank is temporarily adsorbed by a canister that contains an adsorbent such as activated carbon, and negative pressure that occurs when the engine is operated causes the evaporated fuel to be desorbed from the adsorbent in the canister and supplied to an intake port of the engine (see, for example, JP 2011-116209 A).

There is proposed a method for improved desorption performance in a structure including a main canister that contains an adsorbent that is capable of adsorbing and desorbing evaporated fuel generated in a fuel tank and a sub-canister that contains an adsorbent that is capable of adsorbing and desorbing evaporated fuel contained in breakthrough gas discharged from the main canister, wherein an air introduction pipe for the sub-canister is placed above a muffler to increase the temperature of air that flows into the sub-canister during desorption (see, for example, JP 2014-145337 A).

SUMMARY

In the evaporated fuel treatment apparatuses disclosed in JP 2011-116209 A and JP 2014-145337 A, the main canister and the sub-canister are connected by a very short connection pipe. However, the main canister and the sub-canister may be connected by a long connection pipe depending on the placement relationship between the main canister and the sub-canister.

During desorption, air flows into the sub-canister through an air introduction pipe for the sub-canister, and then passes through the connection pipe and flows into the main canister. Therefore, when the main canister and the sub-canister are connected by a long connection pipe, the desorption performance of the main canister can be improved by increasing the temperature of the connection pipe to increase the temperature of air that flows into the main canister.

However, together with air, evaporated fuel contained in breakthrough gas discharged from the main canister stays in the connection pipe. Therefore, if the connection pipe is heated, evaporated fuel expands, and an amount of evaporated fuel that cannot be adsorbed by the adsorbent in the sub-canister may be caused to flow into the sub-canister and evaporated fuel is emitted into the atmosphere from the sub-canister.

In consideration of the above, the present disclosure is directed toward improving the desorption performance of the main canister while suppressing emission of evaporated fuel into the atmosphere when the main canister and the sub-canister are connected by a long connection pipe.

According to an aspect of the present disclosure, there is provided an evaporated fuel treatment apparatus comprising a main canister connected to a fuel tank of a vehicle, the main canister containing an adsorbent that is capable of adsorbing and desorbing evaporated fuel generated in the fuel tank; a sub-canister connected to the main canister, the sub-canister containing an additional adsorbent that is capable of adsorbing and desorbing evaporated fuel contained in breakthrough gas discharged from the main canister; and a connection pipe that connects the main canister and the sub-canister, wherein the connection pipe includes a first portion that is located near an exhaust system for an engine and a second portion which is a portion other than the first portion, the second portion being located apart from the exhaust system for the engine and located below the first portion in the vertical direction with respect to the vehicle.

Air that is light in weight, and evaporated fuel that is heavier than air, stay in the connection pipe. Air that is light in weight stays in the first portion that is located above, and heavier evaporated fuel stays in the second portion that is located below the first portion in the vertical direction with respect to the vehicle.

The second portion of the connection pipe where evaporated fuel stays is placed apart from the exhaust system for the engine, and, as such, is heated less by heat coming from the exhaust system. Therefore, evaporated fuel that stays in the second portion of the connection pipe can be prevented from expanding upon heating to cause an amount of evaporated fuel that cannot be adsorbed by the additional adsorbent in the sub-canister to flow into the sub-canister with some of evaporated fuel being emitted into the atmosphere.

The first portion of the connection pipe where air stays is placed near an exhaust pipe or a muffler that constitutes the exhaust system for the engine, and is heated by heat coming from the exhaust system. With this configuration, the desorption performance of the main canister can be improved by increasing the temperature of air that flows into the main canister during desorption.

According to another aspect of the present disclosure, in the evaporated fuel treatment apparatus, the second portion of the connection pipe may include a first vapor trap that is a portion between the first portion and the main canister, the first vapor trap being located below the first portion in the vertical direction with respect to the vehicle and located either flush with a first connection end of the connection pipe connected to the main canister or below the first connection end of the connection pipe connected to the main canister in the vertical direction with respect to the vehicle.

As evaporated fuel is heavier than air, evaporated fuel contained in breakthrough gas discharged from the main canister flows into the first vapor trap that is located either flush with the first connection end of the connection pipe connected to the main canister or below the first connection end of the connection pipe connected to the main canister in the vertical direction with respect to the vehicle. As evaporated fuel contained in breakthrough gas is heavier than air, and as the amount of such evaporated fuel is small, the evaporated fuel that has flowed into the first vapor trap stays in the first vapor trap and hardly flows into the first portion that is located above. Therefore, the amount of evaporated fuel that flows into the sub-canister can be reduced. The amount of evaporated fuel adsorbed by the additional adsorbent in the sub-canister is reduced, desorption of evaporated fuel from the additional adsorbent in the sub-canister is easy, and the desorption performance of the sub-canister can be improved.

According to still another aspect of the present disclosure, in the evaporated fuel treatment apparatus, the second portion of the connection pipe may include a second vapor trap that is a portion between the first portion and the sub-canister, the second vapor trap being located below the first portion in the vertical direction with respect to the vehicle and located below a second connection end of the connection pipe connected to the sub-canister in the vertical direction with respect to the vehicle.

With this configuration, even when evaporated fuel that has flowed from the main canister flows into the first portion of the connection pipe, the evaporated fuel that has flowed into the first portion flows down toward the second vapor trap that is placed below the first portion in the vertical direction with respect to the vehicle. As the second vapor trap is located below the second connection end of the connection pipe connected to the sub-canister in the vertical direction with respect to the vehicle, the evaporated fuel that has flowed into the second vapor trap hardly flows into the sub-canister. Therefore, even when evaporated fuel flows from the main canister into the first portion, the amount of evaporated fuel that flows into the sub-canister can be reduced. The amount of evaporated fuel adsorbed by the additional adsorbent in the sub-canister is reduced, desorption of evaporated fuel from the additional adsorbent in the sub-canister is easy, and the desorption performance of the sub-canister can be improved.

According to the present disclosure, the desorption performance of the main canister can be improved while suppressing emission of evaporated fuel into the atmosphere when the main canister and the sub-canister are connected by a long connection pipe.

BRIEF DESCRIPTION OF DRAWINGS

Embodiments of the present disclosure will be described based on the following figures, wherein.

DESCRIPTION OF EMBODIMENTS

Figure 1:
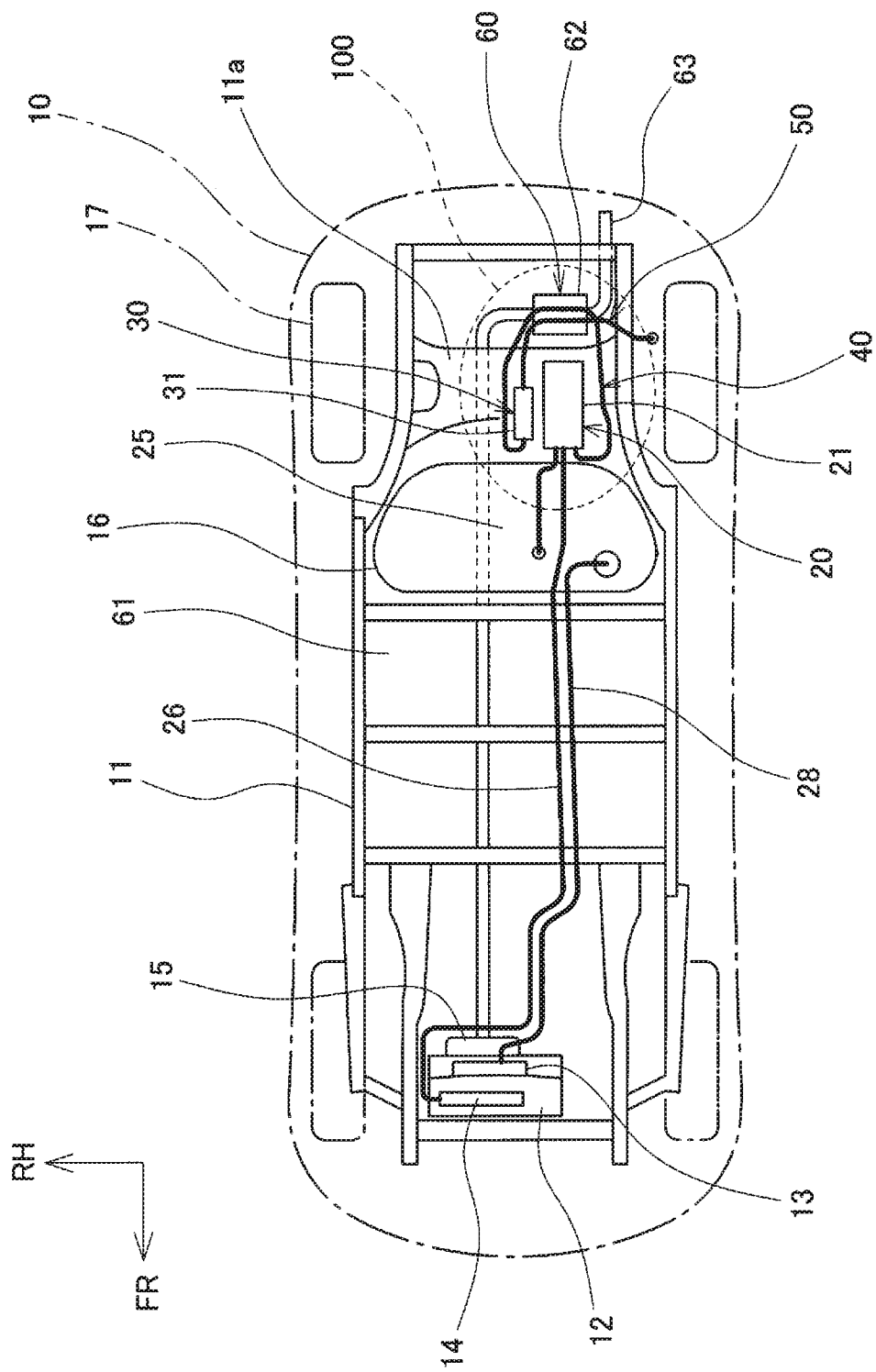
FIG. 1 is a plan view of a vehicle that incorporates an evaporated fuel treatment apparatus according to an embodiment.

An evaporated fuel treatment apparatus 100 according to an embodiment will be described below with reference to the drawings. Arrows FR, UP, and RH in the drawings respectively represent the direction toward the front (traveling direction), the upward direction, and the direction toward the right-hand side with respect to a vehicle. The directions opposite to the arrows FR, UP, and RH are respectively the direction toward the rear, the downward direction, and the direction toward the left-hand side with respect to the vehicle. In the following description, terms front, rear, right, left, up (above), and down (below) when used alone respectively represent the directions toward the front and the rear in the fore-and-aft direction of the vehicle, toward the right and the left in the right-and-left direction of the vehicle (vehicle width direction), and upward and downward in the vertical direction with respect to the vehicle, unless otherwise specified.

Figure 2:
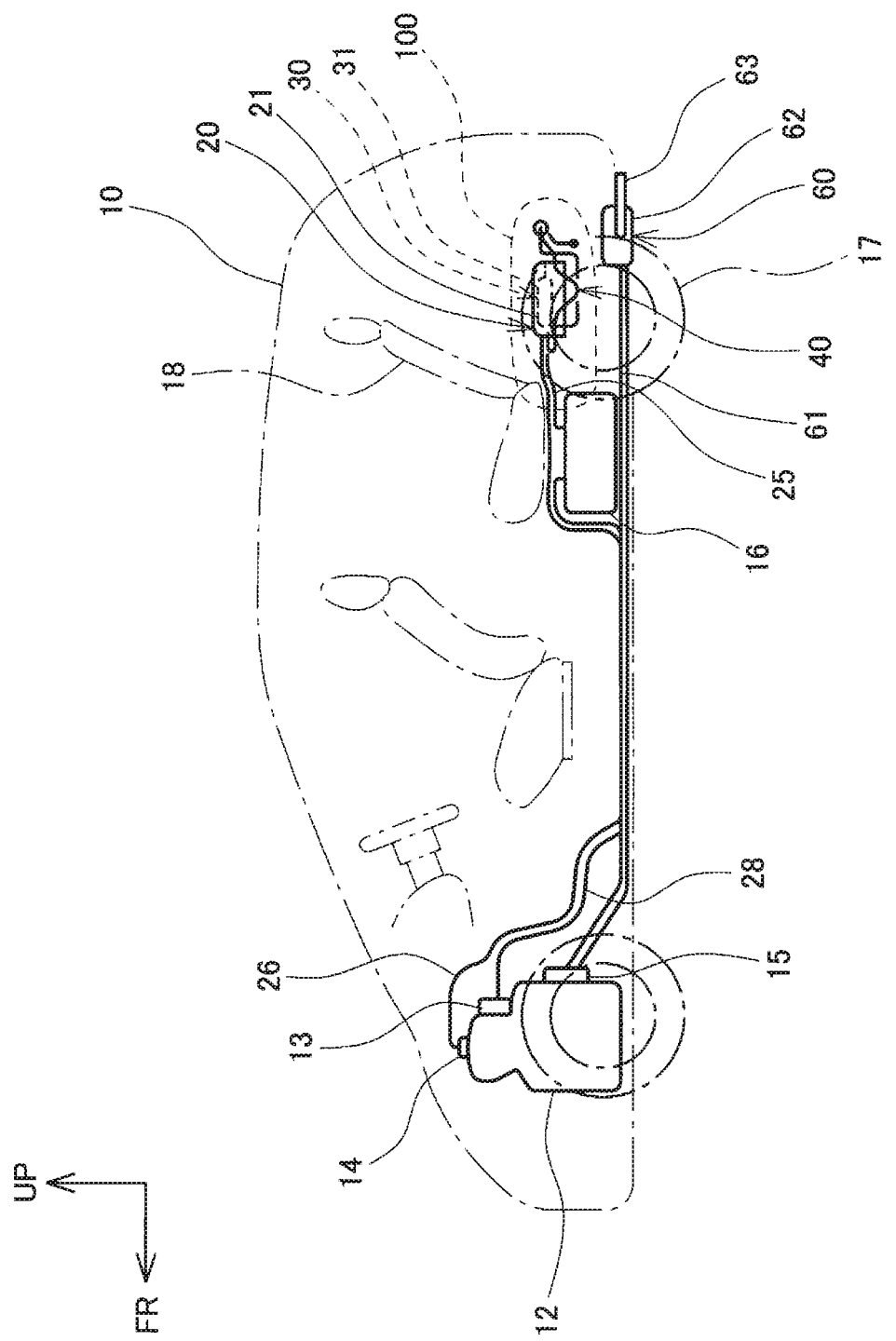
FIG. 2 is a side view of the vehicle that incorporates the evaporated fuel treatment apparatus according to the embodiment.

First, a vehicle 10 that incorporates the evaporated fuel treatment apparatus 100 will be described below. As illustrated in FIG. 1, the vehicle 10 includes an engine 12, a fuel tank 16, an exhaust system 60, and the evaporated fuel treatment apparatus 100. The engine 12 is mounted on a front portion of a frame component 11 of the vehicle 10, and includes a fuel injector 13, an intake manifold 14, and an exhaust manifold 15. As illustrated in FIG. 2, the fuel tank 16 is placed below a rear seat 18. As illustrated in FIG. 1, a fuel pipe 28 connects between the fuel tank 16 and the fuel injector 13 of the engine 12. As illustrated in FIG. 1, the exhaust system 60 includes an exhaust pipe 61 that is connected to the exhaust manifold 15 of the engine 12 and that extends in the fore-and-aft direction of the vehicle, a muffler 62 that is connected to the downstream side of the exhaust pipe 61 and that is placed in the rear of the vehicle, and an exhaust nozzle 63 that is connected to the exhaust side of the muffler 62. As illustrated in FIG. 2, the exhaust pipe 61, the muffler 62, and the exhaust nozzle 63 are placed below a floor panel of the vehicle 10.

Referring to FIGS. 1 and 2, the evaporated fuel treatment apparatus 100 will next be described below. As illustrated in FIGS. 1 and 2, the evaporated fuel treatment apparatus 100 is placed on the vehicle rear side of the fuel tank 16 and above a rear suspension member 11a that is placed between rear wheels 17. The evaporated fuel treatment apparatus 100 includes a main canister 20, a sub-canister 30 that is placed alongside the main canister 20 in the vehicle width direction, and a connection pipe 40 that connects the main canister 20 and the sub-canister 30. The main canister 20 has a casing 21 containing therein an adsorbent that is capable of adsorbing and desorbing evaporated fuel generated in the fuel tank 16. The sub-canister 30 has a casing 31 containing therein an additional adsorbent that is capable of absorbing and desorbing evaporated fuel contained in breakthrough gas discharged from the main canister 20. The adsorbent and the additional adsorbent may be, for example, activated carbon.

An evaporated fuel introduction pipe 25 for introducing evaporated fuel generated in an upper space of the fuel tank 16 to the main canister 20 connects between the main canister 20 and an upper portion of the fuel tank 16. A purge pipe 26 for introducing evaporated fuel desorbed from the adsorbent in the main canister 20 and the additional adsorbent in the sub-canister 30 to the intake manifold 14 connects between the main canister 20 and the intake manifold 14 of the engine 12. An air introduction pipe 50 for introducing air to the main canister 20 and the sub-canister 30 during desorption is connected to a side of the sub-canister 30 that is open to the atmosphere.

Figure 3:
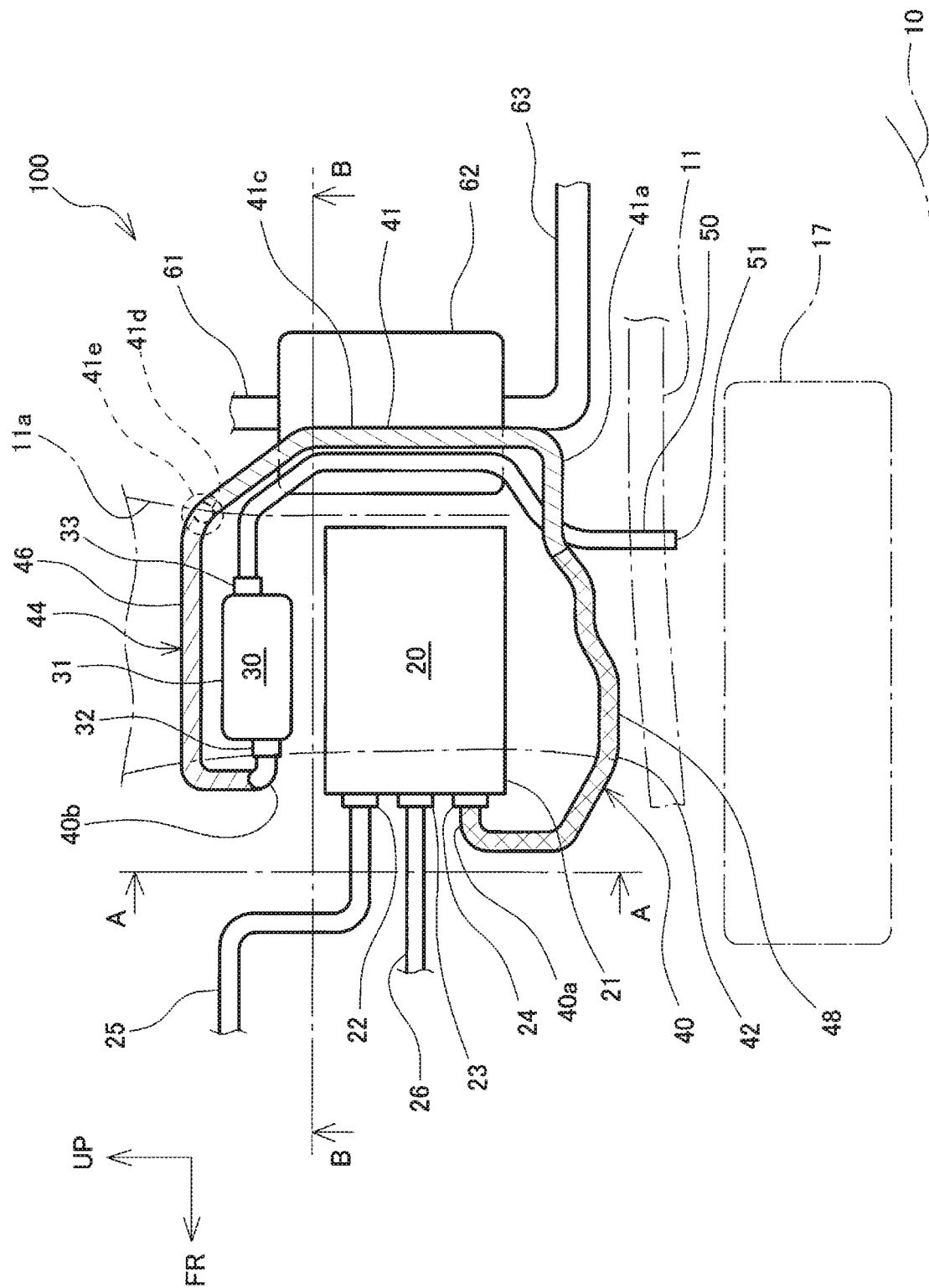
FIG. 3 is a plan view of the evaporated fuel treatment apparatus according to the embodiment.

Referring to FIGS. 3 to 6, details of the evaporated fuel treatment apparatus 100 will next be described below. As illustrated in FIG. 3, the main canister 20 has, on the vehicle front side end of the casing 21, an evaporated fuel port 22 to which the evaporated fuel introduction pipe 25 is connected, a purge port 23 to which the purge pipe 26 is connected, and a connection port 24 to which a first connection end 40a of the connection pipe 40 is connected. The sub-canister 30 has, on the vehicle front side end of the casing 31, an exhaust port 32 to which a second connection end 40b of the connection pipe 40 is connected for introducing breakthrough gas discharged from the main canister 20. The vehicle rear side end of the sub-canister 30 has an atmosphere communicating port 33 to which the air introduction pipe 50 is connected.

As illustrated in FIG. 3, the connection pipe 40 is routed around the vehicle rear end side of the main canister 20 and the sub-canister 30, and connects between the connection port 24 disposed on the vehicle front side of the main canister 20 and the exhaust port 32 disposed on the vehicle front side of the sub-canister 30. The connection pipe 40 includes a first portion 41 which is right hatched in FIGS. 3 to 7, and a second portion 48 which is a portion other than the first portion 41, the second portion 48 being located below the first portion 41 in the vertical direction with respect to the vehicle.

Figure 4:
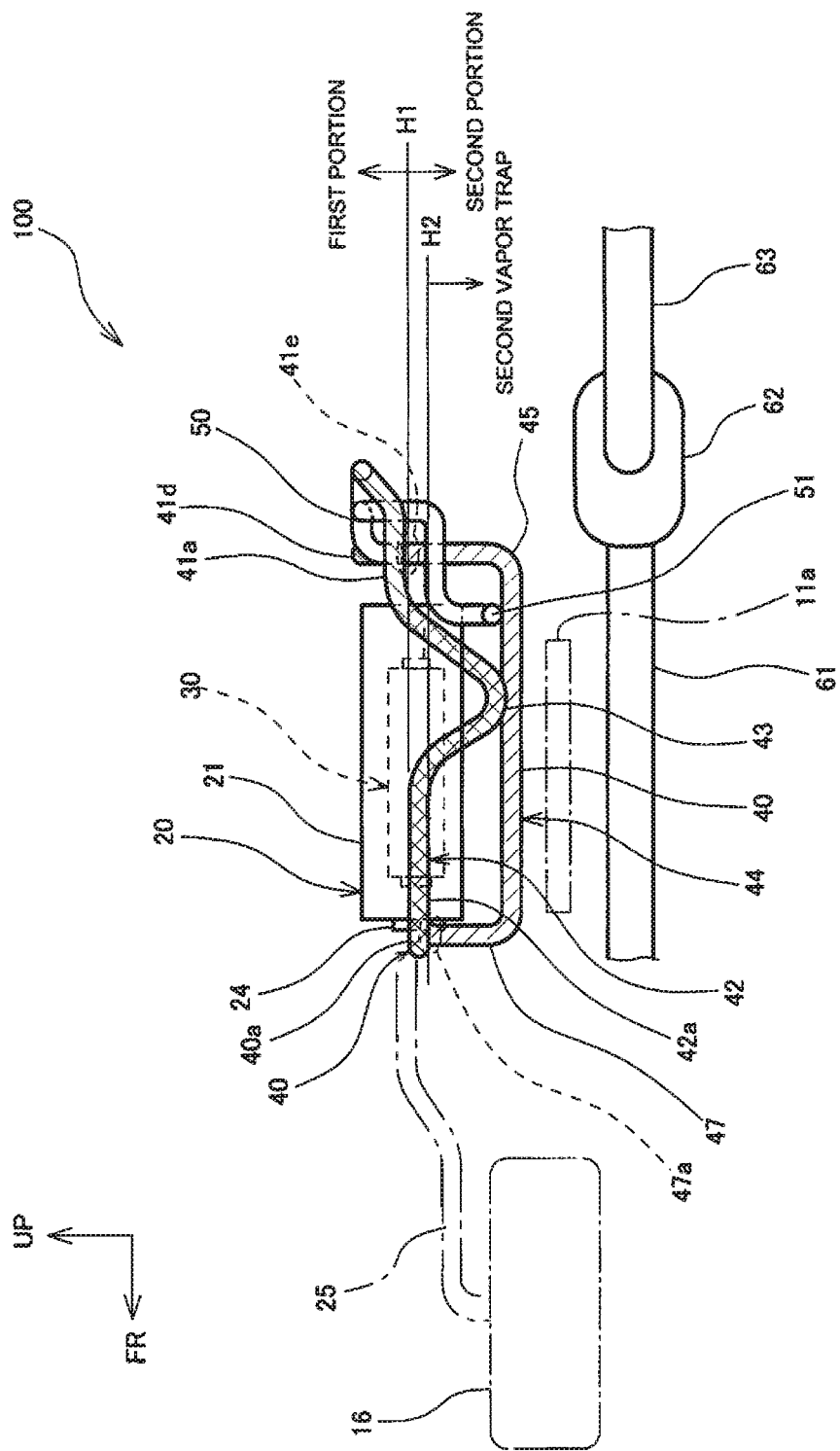
FIG. 4 is a side elevation view of the evaporated fuel treatment apparatus according to the embodiment viewed from the left of the vehicle.
Figure 5:
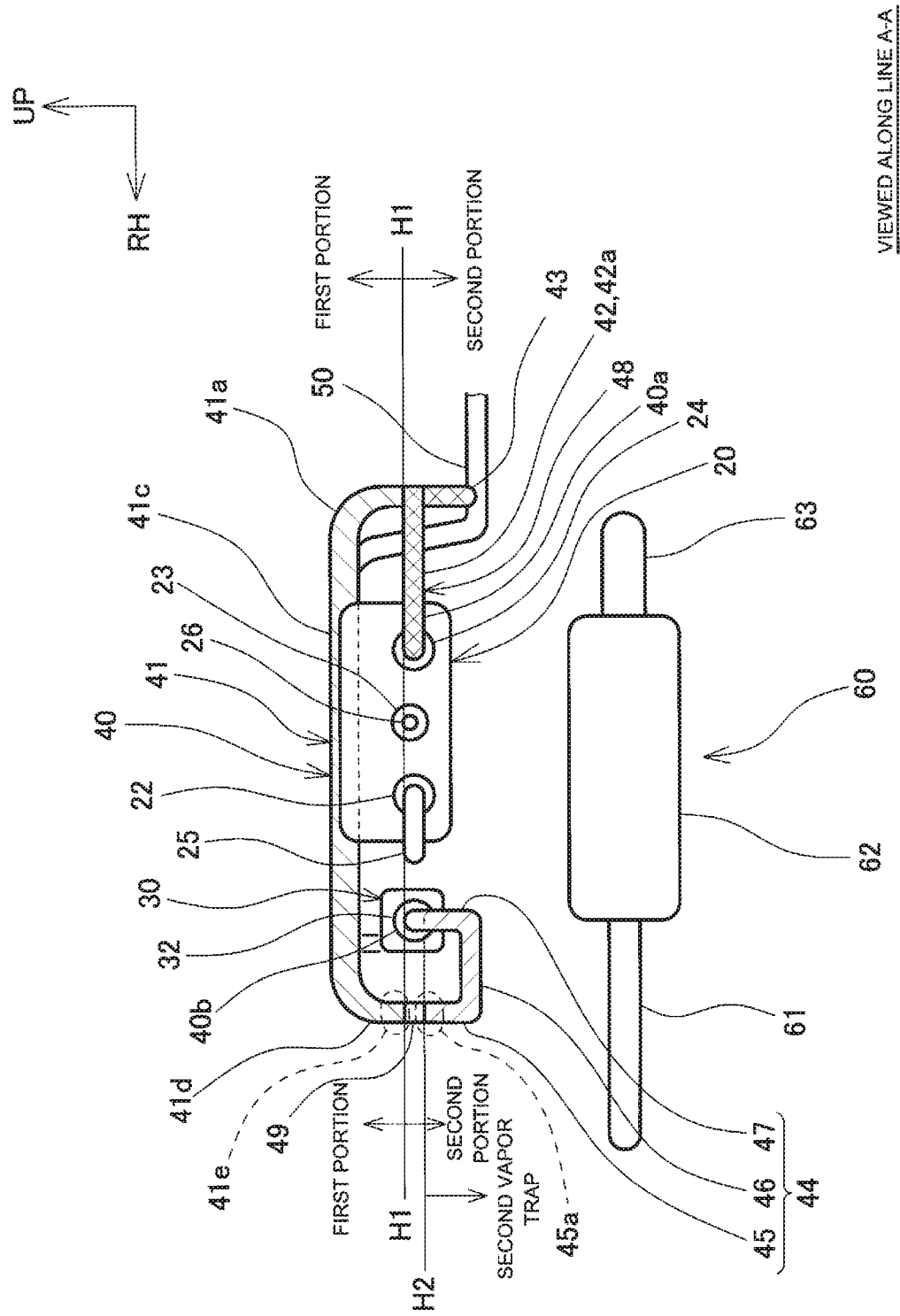
FIG. 5 is a side elevation view of the evaporated fuel treatment apparatus according to the embodiment viewed along line A-A in FIG. 3.

As illustrated in FIGS. 3 to 5, the first portion 41 includes a left-side portion 41a, a central portion 41c, and a right-side portion 41d. The central portion 41c extends in the vehicle width direction on the vehicle rear side of the main canister 20. A portion on the left side of the first portion 41 extends from the central portion 41c obliquely downward toward the front and then extends horizontally toward the front. A portion on the right side of the first portion 41 curves down from the central portion 41c and extends downward. A height H1 illustrated in FIGS. 4 and 5 is a height of a top plane of the first connection end 40a of the connection pipe 40 connected to the connection port 24. The left-side portion 41a is a portion on the left side of the first portion 41 having a bottom plane whose height is located above the height H1 with respect to the vehicle. The right-side portion 41d is a portion on the right side of the first portion 41 that is located above the height H1 with respect to the vehicle. A lower end of the right-side portion 41d is a right end 41e.

The second portion 48 includes a first vapor trap 42 which is cross hatched in the drawings, a second vapor trap 44 which is left hatched in the drawings, an intermediate portion 49 which connects the first portion 41 and the second vapor trap 44, and the second connection end 40b which connects the second vapor trap 44 and the exhaust port 32 of the sub-canister 30.

As illustrated in FIGS. 3 and 5, the first vapor trap 42 is a portion that extends from the connection port 24 of the main canister 20 toward the left of the vehicle and then, as illustrated in FIG. 4, extends toward the rear of the vehicle on the left side of the main canister 20. As illustrated in FIGS. 4 and 5, the first vapor trap 42 includes a horizontal portion 42a and a curved portion 43. The horizontal portion 42a is a portion that extends horizontally toward the rear of the vehicle with the top plane at the height H1. The curved portion 43 is a U curved portion that extends from the rear end of the horizontal portion 42a and is convex downward with respect to the vehicle. The rear end of the curved portion 43 rises to a position higher than the horizontal portion 42a, and is connected to the left-side portion 41a of the first portion 41. The rear end of the curved portion 43 is located at a position where the rising portion of the curved portion 43 reaches the height H1. Therefore, the first vapor trap 42 is located either flush with the height H1 of the top plane of the first connection end 40a or below the height H1 in the vertical direction with respect to the vehicle. The first vapor trap 42 is entirely located below the height H1 and, as such, located below the first portion 41 with respect to the vehicle.

Figure 6:
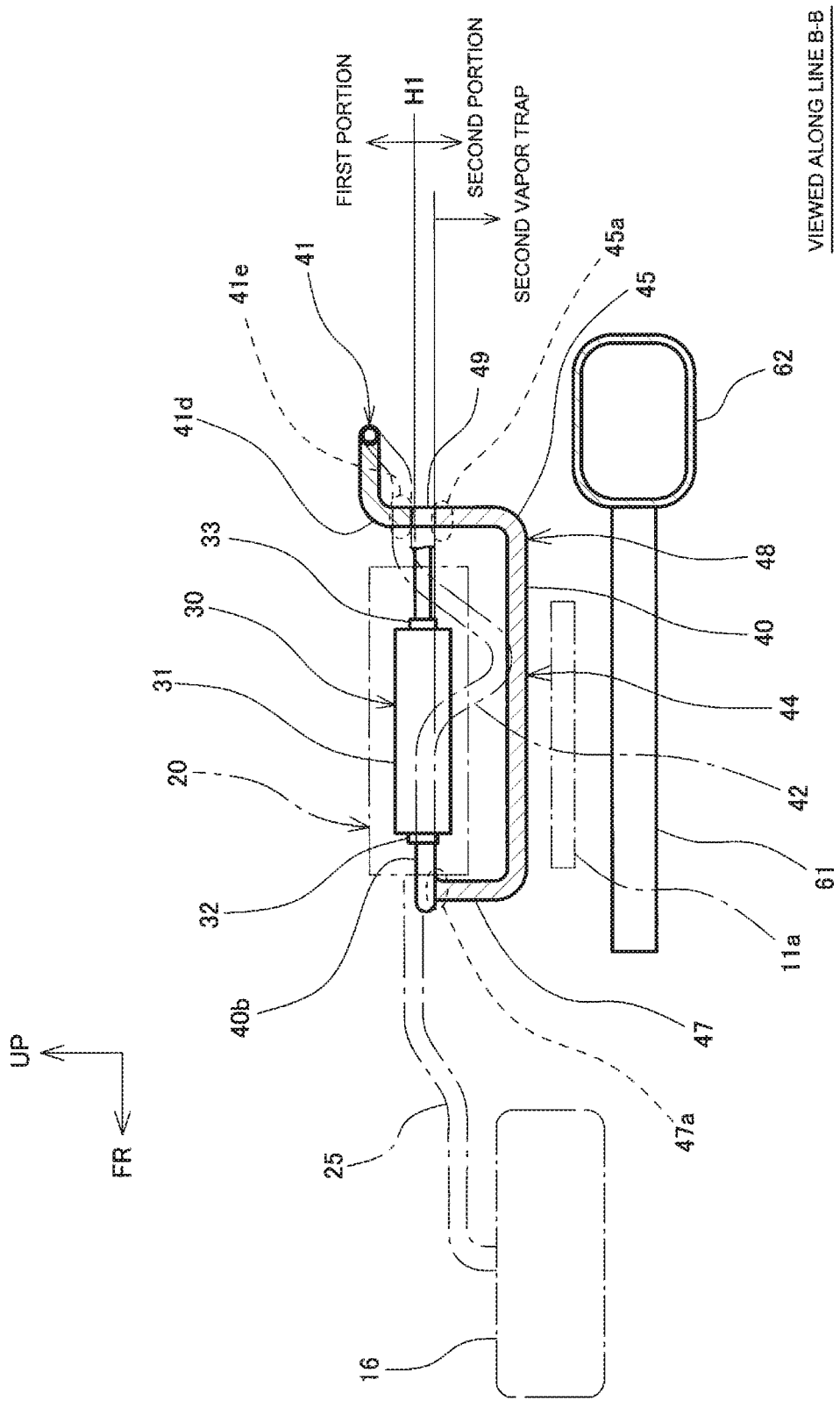
FIG. 6 is a side elevation view of the evaporated fuel treatment apparatus according to the embodiment viewed along line B-B in FIG. 3.

As illustrated in FIG. 6, the intermediate portion 49 that extends downward is connected to the right end 41e of the right-side portion 41d of the first portion 41. The second connection end 40b is connected to the exhaust port 32 of the sub-canister 30. The second vapor trap 44 has a shape of a U that is routed around below the sub-canister 30 with respect to the vehicle and connects between the intermediate portion 49 and the second connection end 40b. The second vapor trap 44 includes a rear vertical pipe 45 that is connected to the intermediate portion 49 and that extends in the vertical direction in the rear of the vehicle, a front vertical pipe 47 that extends downward from the second connection end 40b, and a horizontal pipe 46 that connects the rear vertical pipe 45 and the front vertical pipe 47 in the fore-and-aft direction of the vehicle.

The second connection end 40b connected to the exhaust port 32 extends horizontally toward the front from the exhaust port 32 and then bends down to connect to the front vertical pipe 47. The height of the bottom plane of the second connection end 40b is a height H2. The front vertical pipe 47 is a portion of the pipe that is curved and extends downward from the second connection end 40b, the front vertical pipe 47 being below the height H2. The height of an upper end 47a is the height H2. The rear vertical pipe 45 is a portion of the pipe that extends downward from the intermediate portion 49, the rear vertical pipe 45 being below the height H2. The height of an upper end 45a is the height H2. Therefore, all of the rear vertical pipe 45, the front vertical pipe 47, and the horizontal pipe 46 that constitute the second vapor trap 44 are located below the bottom plane of the second connection end 40b with respect to the vehicle. As the height H2 is below the height H1, the second vapor trap 44 is located below the first portion 41 with respect to the vehicle.

As illustrated in FIG. 1, the air introduction pipe 50 connected to the atmosphere communicating port 33 of the sub-canister 30 extends from the atmosphere communicating port 33 toward the rear with respect to the vehicle and, as illustrated in FIGS. 4 and 5, rises to a height similar to that of the central portion 41c of the first portion 41, and extends toward the left side with respect to the vehicle along the central portion 41c and falls once in the shape of a crank and then again extends toward the left with respect to the vehicle. The tip of the air introduction pipe 50 constitutes an air inlet 51 that is open to the atmosphere.

As illustrated in FIGS. 3 to 6, the muffler 62 is placed below the central portion 41c of the first portion 41 of the connection pipe 40 and the air introduction pipe 50. Therefore, when the engine 12 is operated, the first portion 41 of the connection pipe 40 and the air introduction pipe 50 are heated by heat coming from the muffler 62. On the other hand, as illustrated in FIGS. 1 and 3, the second portion 48 including the first vapor trap 42 and the second vapor trap 44 is placed apart from the exhaust pipe 61 and the muffler 62 and, as such, is heated less by heat coming from the exhaust pipe 61 or the muffler 62.

Figure 7:
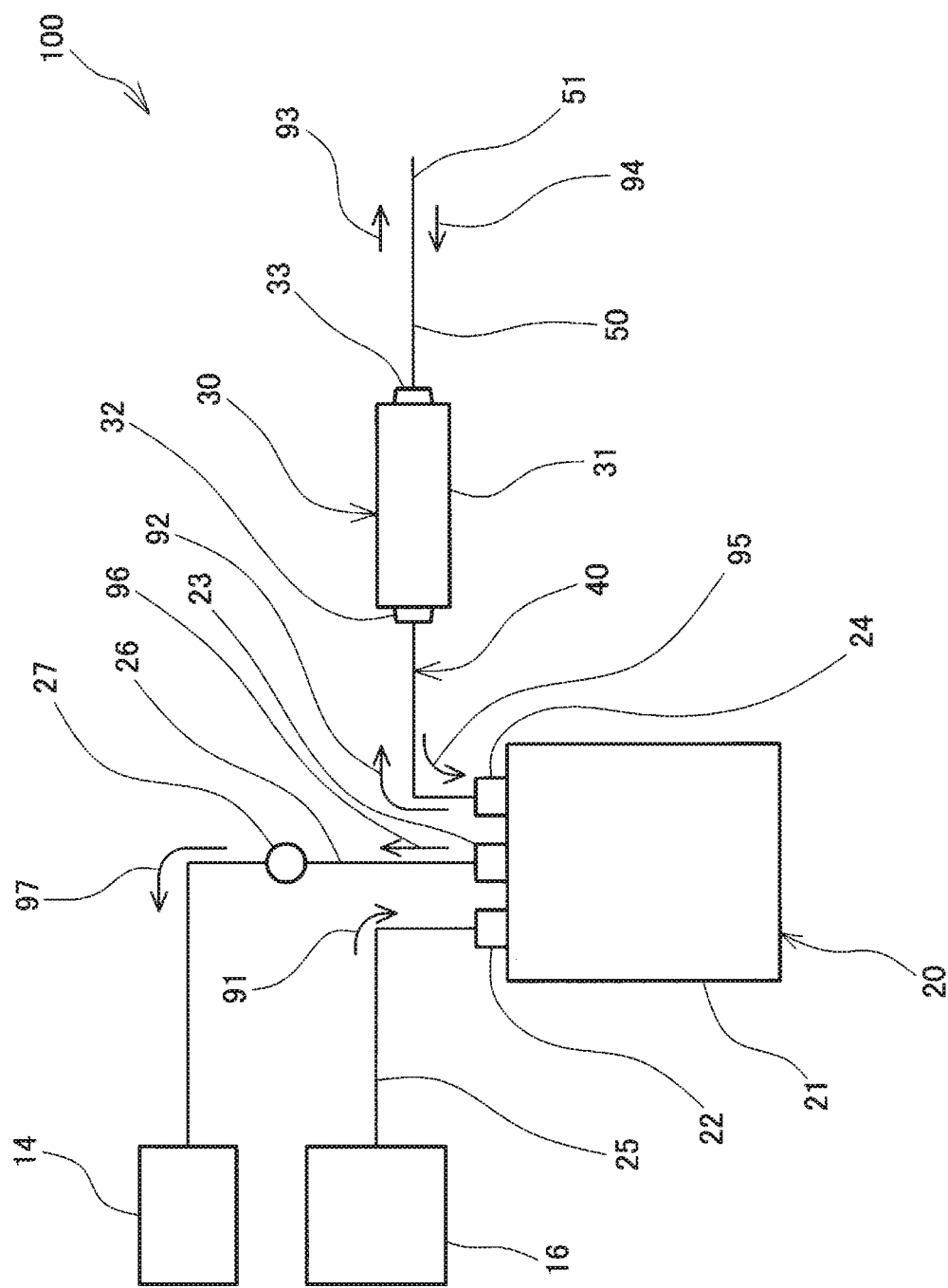
FIG. 7 illustrates the system structure and the operation of the evaporated fuel treatment apparatus according to the embodiment.

Referring to FIG. 7, the operation of the evaporated fuel treatment apparatus 100 configured as described above will next be described below. First, the basic operation of the evaporated fuel treatment apparatus 100 will be described below.

During refueling, the engine 12 of the vehicle 10 is stopped, and a purge control valve 27 is closed. When the fuel tank 16 is refueled, as denoted by an arrow 91 in FIG.

7, evaporated fuel generated in the fuel tank 16, together with air, passes through the evaporated fuel introduction pipe 25 and flows into the main canister 20 via the evaporated fuel port 22. The evaporated fuel is then adsorbed by the adsorbent that is contained in the casing 21. As denoted by an arrow 92 in FIG. 7, a small amount of evaporated fuel that has failed to be adsorbed by the adsorbent in the main canister 20, together with air, is discharged from the main canister 20 to the connection pipe 40 as emission gas, and flows into the sub-canister 30. The evaporated fuel is then adsorbed and removed by the additional adsorbent contained in the casing 31 of the sub-canister 30. As denoted by an arrow 93 in FIG. 7, air discharged from the fuel tank 16 passes through the air introduction pipe 50 via the atmosphere communicating port 33 and is emitted into the atmosphere from the air inlet 51. When the vehicle 10 is parked with the engine 12 of the vehicle 10 being stopped, a similar operation is performed.

When the engine 12 is driven, the purge control valve 27 turns open, and, as denoted by an arrow 94 in FIG. 7, negative pressure in the intake manifold 14 of the engine 12 causes air to pass through the air introduction pipe 50 via the air inlet 51 and flow into the sub-canister 30. Air that has flowed into the sub-canister 30 causes desorption of evaporated fuel that is adsorbed by the additional adsorbent contained in the casing 31, and, as denoted by an arrow 95 in FIG. 7, flows from the exhaust port 32 through the connection pipe 40 into the main canister 20 via the connection port 24 to cause desorption of evaporated fuel that is adsorbed by the adsorbent contained in the casing 21. Evaporated fuel that has been desorbed from the adsorbents in the sub-canister 30 and the main canister 20, together with air that has been introduced via the air inlet 51, flows via the purge port 23 of the main canister 20 through the purge pipe 26 and the purge control valve 27, and, as denoted by arrows 96 and 97 in FIG. 7, flows into the intake manifold 14 of the engine 12 and is subjected to combustion in the engine 12.

Details of the operation of the evaporated fuel treatment apparatus 100 according to the embodiment will next be described below. During refueling, gas including evaporated fuel in an upper space of the fuel tank 16 flows into the main canister 20, and the evaporated fuel is adsorbed by the adsorbent contained in the main canister 20. A small amount of evaporated fuel that has failed to be adsorbed by the adsorbent in the main canister 20, together with air, is discharged from the main canister 20 to the connection pipe 40 as emission gas, and flows into the horizontal portion 42a of the first vapor trap 42. As evaporated fuel contained in emission gas is heavier than air, the evaporated fuel that has flowed into the horizontal portion 42a flows down into the curved portion 43 that is convex downward from the horizontal portion 42a. Therefore, air remains in the horizontal portion 42a. Air escapes upward from the curved portion 43, flows into the sub-canister 30 through the first portion 41, and is emitted into the atmosphere from the sub-canister 30 through the air introduction pipe 50. As a result, evaporated fuel stays in the curved portion 43, and only air stays in the horizontal portion 42a, the first portion 41 that is placed at a height higher than the horizontal portion 42a, and a portion between the first portion 41 of the connection pipe 40 and the sub-canister 30. As such, when the amount of evaporated fuel contained in emission gas is small, the evaporated fuel stays only in the curved portion 43, and principally only air stays in the remaining portions including the first portion 41 of the connection pipe 40. Therefore, evaporated fuel contained in emission gas hardly flows into the sub-canister 30.

As the height of the top plane of the horizontal portion 42a is flush with the height H1 of the top plane of the first connection end 40a, if the amount of evaporated fuel contained in emission gas increases to some extent, the evaporated fuel overflows from the curved portion 43 and stays in the horizontal portion 42a as well. However, as the first portion 41 is entirely located above the height H1, principally only air stays in the first portion 41, the second vapor trap 44 between the first portion 41 of the connection pipe 40 and the sub-canister 30, the intermediate portion 49, and the second connection end 40b.

As such, when emission gas does not contain a significant amount of evaporated fuel, evaporated fuel stays in the first vapor trap 42 that is composed of the horizontal portion 42a and the curved portion 43, and hardly flows into the first portion 41. Therefore, only air stays in the first portion 41, and evaporated fuel contained in emission gas hardly flows into the sub-canister 30.

If the amount of evaporated fuel contained in emission gas further increases, the evaporated fuel flows from the first vapor trap 42 into the first portion 41. The evaporated fuel that has flowed into the first portion 41 flows down toward the horizontal pipe 46 of the second vapor trap 44 that is placed below the first portion 41 in the vertical direction with respect to the vehicle. As the second vapor trap 44 is located below the bottom plane of the second connection end 40b connected to the exhaust port 32 with respect to the vehicle, the evaporated fuel that has flowed into the second vapor trap 44 hardly flows into the sub-canister 30. As such, even when evaporated fuel flows from the main canister 20 into the first portion 41, the evaporated fuel stays in the second vapor trap 44, only air stays in the first portion 41, and evaporated fuel contained in emission gas principally does not flow into the sub-canister 30.

With the engine being driven, evaporated fuel is purged as described above, and therefore at this time, while evaporated fuel is desorbed from the main canister 20 and the sub-canister 30, evaporated fuel in the first vapor trap 42 and the second vapor trap 44 is replaced with air.

As described above, in the evaporated fuel treatment apparatus 100 according to the embodiment, air that is light in weight stays in the first portion 41 that is placed above, and heavier evaporated fuel stays in the first vapor trap 42 or the second vapor trap 44 of the second portion 48 that is placed below the first portion 41 in the vertical direction with respect to the vehicle. Therefore, evaporated fuel contained in emission gas can be prevented from flowing into the sub-canister 30. The amount of evaporated fuel adsorbed by the additional adsorbent in the sub-canister 30 is reduced, desorption of evaporated fuel from the additional adsorbent in the sub-canister 30 is easy, and the desorption performance of the sub-canister 30 can be improved.

As illustrated in FIGS. 1 and 3, the first vapor trap 42 of the connection pipe 40 where evaporated fuel stays is placed apart from the exhaust pipe 61 or the muffler 62 for the engine 12, and, as such, is heated less by heat coming from the exhaust pipe 61 or the muffler 62. Therefore, evaporated fuel that stays in the first vapor trap 42 of the connection pipe 40 can be prevented from expanding upon heating to cause an amount of evaporated fuel that cannot be adsorbed by the additional adsorbent in the sub-canister 30 to flow into the sub-canister 30 with some of evaporated fuel being emitted into the atmosphere.

Similarly, the second vapor trap 44 of the connection pipe 40 is also placed apart from the exhaust pipe 61 or the muffler 62, and, as such, is heated less by heat coming from the exhaust pipe 61 or the muffler 62. Therefore, even when the amount of evaporated fuel discharged from the main canister 20 is increased and evaporated fuel stays in the second vapor trap 44, evaporated fuel that stays in the second vapor trap 44 of the connection pipe 40 can be prevented from expanding upon heating to cause an amount of evaporated fuel that cannot be adsorbed by the additional adsorbent in the sub-canister 30 to flow into the sub-canister 30 with some of evaporated fuel being emitted into the atmosphere.

On the other hand, the first portion 41 of the connection pipe 40 where only air stays is placed near the muffler 62 of the exhaust system 60 for the engine 12 and is heated by heat coming from the muffler 62. During desorption of evaporated fuel from the adsorbents, air flows into the sub-canister 30 through the air introduction pipe 50 and passes through the connection pipe 40 to flow into the main canister 20. Therefore, the desorption performance of the main canister 20 can be improved by increasing the temperature of the connection pipe 40 that connects the main canister 20 and the sub-canister 30 to increase the temperature of air that flows into the main canister 20.

In the evaporated fuel treatment apparatus 100 according to the embodiment, the air introduction pipe 50 is also placed near the muffler 62, and is heated by heat coming from the muffler 62. Therefore, the desorption performance of the sub-canister 30 and the main canister 20 can be further improved by increasing the temperature of air flowing from the sub-canister 30 into the main canister 20.

As described above, by employing the evaporated fuel treatment apparatus 100 according to the embodiment, when the connection pipe 40 between the main canister 20 and the sub-canister 30 is long, the desorption performance of the main canister 20 and the sub-canister 30 can be improved while emission of evaporated fuel into the atmosphere is being suppressed.

The first vapor trap 42 of the evaporated fuel treatment apparatus 100 according to the embodiment described above includes the curved portion 43, but structures that do not include the curved portion 43 may be employed. Similar to the first vapor trap 42, the second vapor trap 44 may be configured to, rather than having the shape of a U, include a horizontal portion and a curved portion that is curved and convex downward from the horizontal portion.

In the evaporated fuel treatment apparatus 100 according to the embodiment described above, the main canister 20 and the sub-canister 30 are placed side by side in the vehicle width direction, and the connection pipe 40 is routed around the vehicle rear end side of the main canister 20 and the sub-canister 30, with a vehicle rear side portion of the connection pipe 40 serving as the first portion 41 that is located at a higher position, and the remaining portion serving as the second portion 48 that is placed below the first portion 41, but the present disclosure is not limited to this embodiment. Any configuration having the first portion 41 placed above the muffler 62 and the second portion 48 placed at a position spaced apart from the muffler 62 may be employed. The manner in which the main canister 20 and the sub-canister 30 are placed, and the shape of the connection pipe 40, are not limited to those in the above-described example.

The second vapor trap 44 of the evaporated fuel treatment apparatus 100 according to the embodiment described above is placed apart from the exhaust pipe 61 and the muffler 62, but other configurations are also possible. For example, the second vapor trap 44 may be configured to be less affected by heat coming from the exhaust pipe 61 and the muffler 62 by, in addition to being placed apart from the exhaust pipe 61, being configured so that heat coming from the exhaust pipe 61 is blocked by the rear suspension member 11a that is placed below the second vapor trap 44.

The invention claimed is:

1. An evaporated fuel treatment apparatus comprising:
a main canister connected to a fuel tank of a vehicle, the main canister containing an adsorbent that is capable of adsorbing and desorbing evaporated fuel generated in the fuel tank;
a sub-canister connected to the main canister, the sub-canister containing an additional adsorbent that is capable of adsorbing and desorbing evaporated fuel contained in breakthrough gas discharged from the main canister; and
a connection pipe that connects the main canister and the sub-canister, the connection pipe includes a first portion and a second portion which is a portion other than the first portion, the second portion being located spaced apart from an exhaust system for an engine and located below the first portion in a vertical direction with respect to the vehicle,
wherein the second portion of the connection pipe includes a first sub-portion including a first vapor trap that is a portion between the first portion and the main canister, the first vapor trap being located below the first portion in the vertical direction with respect to the vehicle and located either flush with a first connection end of the connection pipe connected to the main canister or below the first connection end of the connection pipe connected to the main canister in the vertical direction with respect to the vehicle, and
wherein the second portion of the connection pipe further includes a second sub-portion including a second vapor trap that is a portion between the first portion and the sub-canister, the second vapor trap being located below the first portion in the vertical direction with respect to the vehicle and located below a second connection end of the connection pipe connected to the sub-canister in the vertical direction with respect to the vehicle.

2. An evaporated fuel treatment apparatus comprising:
a main canister connected to a fuel tank of a vehicle, the main canister containing an adsorbent that is capable of adsorbing and desorbing evaporated fuel generated in the fuel tank;
a sub-canister connected to the main canister, the sub-canister containing an additional adsorbent that is capable of adsorbing and desorbing evaporated fuel contained in breakthrough gas discharged from the main canister; and
a connection pipe that connects the main canister and the sub-canister,
wherein the connection pipe includes a first portion and a second portion which is a portion other than the first portion, the second portion being located spaced apart from an exhaust system for an engine and located below the first portion in a vertical direction with respect to the vehicle, and
wherein the second portion of the connection pipe includes a vapor trap that is a portion between the first portion and the sub-canister, the vapor trap being located below the first portion in the vertical direction with respect to the vehicle and located below a second connection end of the connection pipe connected to the sub-canister in the vertical direction with respect to the vehicle.

* * * * *